United States Patent [19]

Mossey

[11] 4,356,892

[45] Nov. 2, 1982

[54] MATERIAL DISPENSER

[75] Inventor: Robert A. Mossey, Cheyenne, Wyo.

[73] Assignee: AMF Incorporated, White Plains, N.Y.

[21] Appl. No.: 143,400

[22] Filed: Apr. 25, 1980

[51] Int. Cl.³ ............................................... B66B 9/20
[52] U.S. Cl. .................................. 187/9 R; 211/49 R; 108/136
[58] Field of Search .................. 187/9 R, 9 E, 11, 12, 187/20, 22, 27; 414/99, 118; 280/47.34; 108/136; 211/51, 49; 312/61, 71; 221/226, 227; 220/93

[56] References Cited

U.S. PATENT DOCUMENTS

| | | | |
|---|---|---|---|
| 664,041 | 12/1900 | Hadfield | 187/22 |
| 1,344,272 | 6/1920 | Hescock et al. | 187/11 |
| 1,408,522 | 3/1922 | Laue | 187/11 |
| 1,721,603 | 7/1929 | Neenan | 187/27 |
| 2,241,798 | 5/1941 | Weiss | 187/9 R |
| 2,444,776 | 7/1948 | Kalning et al. | 211/49 D |
| 2,560,928 | 7/1951 | Bockius | 108/136 |
| 2,626,727 | 1/1953 | Gibbs et al. | 220/93 |
| 2,934,211 | 4/1960 | Shivek | 211/49 D |
| 3,154,029 | 10/1964 | Bronson | 108/136 |
| 3,436,136 | 4/1969 | McKechnie | 312/71 |
| 3,796,285 | 3/1974 | Grebenstein | 187/20 |
| 4,161,146 | 7/1979 | Kooiman | 108/136 |

FOREIGN PATENT DOCUMENTS 110250  7/1928  Austria .................. 220/93

Primary Examiner—H. Grant Skaggs
Attorney, Agent, or Firm—David E. Dougherty; Charles J. Worth

[57] ABSTRACT

A table is suspended off springs, the upper ends of which can be lowered by a crank mechanism so that there is no spring load on the table when it is lowered for loading.

6 Claims, 4 Drawing Figures

MATERIAL DISPENSER

This invention relates to a material dispenser, and more particularly, to an adjustable material dispenser which can be used in the conventional way, or readily adjusted to have no spring load on the dispenser table when it is being loaded, or to operate as a straightforward lift mechanism.

In one form of conventional material dispenser the table is suspended off tension springs. As the table is loaded with material the springs are elongated and the table descends, and as the table is unloaded the springs contract to raise the table. In the instant invention I provide means to additionally lower and load the table without any spring raising tension force being imposed thereon, or for operating the table as a straightforward positive lift.

The invention will be best understood by considering the following detailed description of one embodiment thereof taken in connection with the accompanying drawings in which FIG. 1 is a broken away side elevation view;

Figures 1, 2:
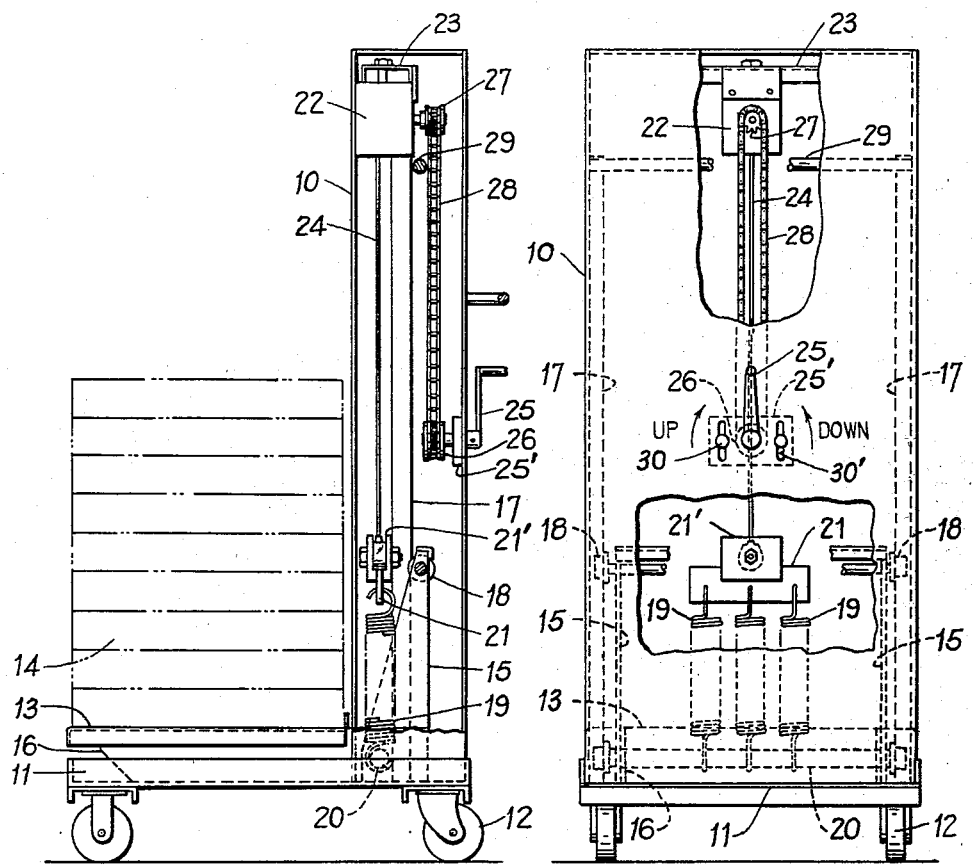
FIG. 2 is a broken away rear elevation view thereof.

As shown in the drawings, the device comprises a generally L-shaped exterior frame comprising an upright box 10 and horizontal base 11 mounted on wheels 12. A table 13 positioned in front of the box 10 and above the base 11 is adapted to have a load 14 positioned thereon.

Table 13 is supported by a generally L-shaped movable carriage comprising upright frame parts 15 and horizontal frame parts 16. Table 13 rests on carriage part 16 which bottoms on the base 11, whereas carriage part 15 is positioned inside the box 10. Opposite sides of the box 10 have vertical guides 17 thereon which are engaged by opposite top and bottom side rollers 18 on carriage part 15. The carriage 15, 16, is suspended off a series of vertical tension springs 19. At their bottom ends springs 19 hook on to a cross piece 20 on the carriage and at their upper ends they hook on to a spring hanger 21.

A self-locking hoist box 22 is positioned at the upper end of box 10 on a cross member 23. Hoist 22, which is conventional and readily available on the market place includes a cable 24 connected at its lower end to the spring hanger 21 and at its upper end to a not shown cable drum or the like inside the hoist box 22.

The spring hanger 21 can be lowered and raised by the hoist 22, 24 by a manual crank 25 positioned on the back of box 10. Crank 25 operates the hoist through a sprocket-chain mechanism comprising a sprocket wheel 26 connected to the crank 25 and a sprocket wheel 27 on the hoist box, the two being inter-connected by a chain 28.

Figures 3, 4:
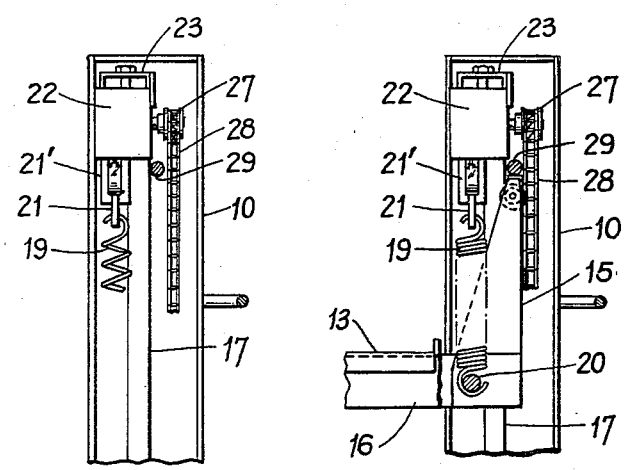
FIG. 3 is a view comparable to FIG. 1 but showing another position of the mechanism thereof.
FIG. 4 is a view comparable to FIG. 3 but showing still another position.

When the crank 25 is cranked in one direction it operates the hoist to lower the spring hanger 21, and in the opposite direction it raises the spring hanger. When it is all the way down the carriage 15, 16 bottoms on the base 11 and when it is all the way up the carriage butts up against a stop 29 (see FIG. 4) adjacent the hoist box.

FIGS. 1 and 2 show the position of the parts when loading the table 14 with stacked material. The crank 25 has first been rotated to lower the table 13 and spring hanger 21 so the device is loaded without any spring tension on the carriage 15, 16. In other words, the device has been moved from the FIG. 4 position to the FIG. 1 position. After the table is loaded then the crank is turned to raise the spring hanger 21 to elongate or tension the springs 19. This is the FIG. 3 position of the device. The hanger has been hoisted until its cable connector fitting 21' butts up against the underside of hoist box 22. Since the table is now suspended off the springs it will automatically rise as material is unloaded off the table. In other words, in the FIG. 1 position the springs 19 were in effect disabled. When all the material is unloaded from the table the carriage will have risen all the way to the FIG. 4 position at which time it butts up against the stop 29.

The device can be operated in the conventional way by not disabling the springs prior to loading. That is to say, after the table is unloaded instead of going from FIG. 4 to FIG. 1 the device can be left in the FIG. 4 position and simply loaded with material. As this is done the springs will be elongated and the table will lower, which is also the FIG. 3 position of the device.

Besides the above described two modes of operating or using the device, it can also be operated as a straightforward lift or elevator. That is to say, the spring assembly 19, 21, 21' can be removed and the cable 24 directly connected to the carriage 15, 16, so that it is raised and lowered solely at the crank 25.

When operating the unit for automatic table travel under spring tension it is possible to adjust the spring force by adding or subtracting the number of springs hooked on to the hanger 21 and cross piece 20. In addition, tension in the chain 28 can be adjusted at the mounting plate 25' of the crank handle 25. As shown, plate 25' is mounted to the back panel of box 10 by studs 30 positioned in a pair of vertical slots 30' in the back panel. So, the sprocket 26 can be adjusted up or down slightly to adjust the tension in the chain 28.

The invention is very useful from the standpoint of safety and reducing handling costs in industrial and other environments. For example, if one wanted to load a stack of material on the device when in the FIG. 4 position this would have to be done one piece at a time. That is to say, if one tried to put the entire stack on the table in one operation the table would drop abruptly and then bounce up and down, a condition which would be unsafe for the person handling the stack or which might cause the stack to tip over. The problem is the same in trying to transfer a dolly of stacked material off a fork lift truck to the table. However, if the device is first brought to the FIG. 1 position it is then much safer to transfer stacks of material to the table whether by hand or from a lift truck. Of course, in addition to this advantage, the invention makes it possible for the device to operate in the conventional way, and also as a positive lift.

I claim:

1. In a spring loaded material dispenser which is adapted to automatically ascend and descend as material is removed and added thereto, said dispenser including a vertically movable table suspended off the lower ends of a series of elongated tension springs, the upper ends of said springs being connected to a spring hanger, and manual means for lowering said hanger from a raised spring tensioned position to a spring de-tensioned position thereby lowering the table to a fixed loading position and for raising said hanger to tension said springs thereby urging said table to move vertically as material is removed and added thereto.

2. In a dispenser as in claim 1, a vertically movable carriage for said table, the lower ends of said springs being connected to said carriage, said manual means comprising a crank, a cable operated by said crank connected to said hanger, and said cable being adapted to be disconnected from said hanger for direct connection to said carriage.

3. In a dispenser as in claim 2, an exterior L-shaped frame, said carriage being L-shaped and operable in said frame, the base of said L-shaped carriage when said crank is operated to de-tension said springs bottoming on the base of said L-shaped frame to enable loading of said table in set bottom position, and said crank and cable being operable to return said hanger to raised spring tensioned position after said table is loaded whereby said table will then automatically rise as material is unloaded from said table.

4. A material dispenser comprising an L-shaped frame, a movable L-shaped carriage on said frame, the upright of said carriage being operable up and down in the upright of said frame and said carriage base being adapted to bottom on the base of said frame, a series of elongated tension springs in said frame upright, a hoist in the upper end of said frame, the upper ends of said springs being connected to a spring hanger and a cable extending from said hoist to said hanger, and manual means on said frame to raise said cable to raise said hanger to tension said springs whereby said carriage is suspended off said springs and to lower said cable to lower said hanger to bottom said carriage base on said frame base.

5. In a dispenser as in claim 4, stop means on the upper end of said frame for limiting upward movement of said hanger and carriage, said manual means comprising a crank for operating said cable hoist, and said cable being adapted to be disconnected from said hanger for connection to said carriage for positive direct movement of said carriage by said crank.

6. In a material dispenser comprising a frame and a carriage movably mounted therein from a raised position to a bottomed position, a series of elongated coil springs having one of their ends connected to said carriage, a single manually movable means connected to the other ends of said springs to stretch the same whereby said carriage is suspended in said frame off said springs to automatically move vertically when articles are added and removed, and said same means being operable in an opposite sense to collapse said springs to return said carriage to said bottomed position in said frame to a fixed carriage loading position.

* * * * *